(12) United States Patent
Hwang et al.

(10) Patent No.: US 11,625,068 B2
(45) Date of Patent: Apr. 11, 2023

(54) DISPLAY DEVICE

(71) Applicant: Samsung Display Co., LTD., Yongin-si (KR)

(72) Inventors: Hyun-Been Hwang, Suwon-si (KR); Hirotsugu Kishimoto, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 60 days.

(21) Appl. No.: 17/227,902

(22) Filed: Apr. 12, 2021

(65) Prior Publication Data

US 2021/0397221 A1   Dec. 23, 2021

(30) Foreign Application Priority Data

Jun. 22, 2020   (KR) .................. 10-2020-0075894

(51) Int. Cl.
*G06F 1/16* (2006.01)
*G06F 3/041* (2006.01)

(52) U.S. Cl.
CPC .......... *G06F 1/1643* (2013.01); *G06F 1/1616* (2013.01); *G06F 3/041* (2013.01); *G06F 3/0416* (2013.01)

(58) Field of Classification Search
None
See application file for complete search history.

(56) References Cited

U.S. PATENT DOCUMENTS

| | | | |
|---|---|---|---|
| 4,180,608 A | 12/1979 | Del | |
| 2011/0157762 A1* | 6/2011 | Kurashima | G06F 3/0443 361/277 |
| 2011/0210937 A1* | 9/2011 | Kee | G06F 3/041 345/173 |
| 2014/0362012 A1* | 12/2014 | Lee | G06F 3/046 345/173 |
| 2016/0041428 A1* | 2/2016 | Hirakata | G02F 1/133621 345/212 |
| 2017/0277299 A1* | 9/2017 | Yokoyama | G06F 3/0445 |

(Continued)

FOREIGN PATENT DOCUMENTS

| | | |
|---|---|---|
| EP | 3 764 208 | 1/2021 |
| JP | 2012-14461 | 1/2012 |

(Continued)

OTHER PUBLICATIONS

Extended European search report for European Patent Application or Patent No. 21179378.1 dated Nov. 17, 2021.

*Primary Examiner* — Nicholas J Lee

(74) *Attorney, Agent, or Firm* — Kile Park Reed & Houtteman PLLC

(57) ABSTRACT

A display device includes a window containing a glass substrate, a display panel disposed under the window, and a digitizer disposed under the display panel, wherein the digitizer includes a base film disposed under the display panel, a first conductive layer disposed under the base film, a first insulating layer disposed under the first conductive layer, a second conductive layer disposed under the first insulating layer, a second conductive layer disposed under the second conductive layer, and the second insulating layer disposed under the second conductive layer, and the window, the display panel, and the digitizer may be capable of being folded and unfolded.

20 Claims, 14 Drawing Sheets

(56) References Cited

U.S. PATENT DOCUMENTS

2017/0308230 A1 10/2017 Sakabe et al.
2020/0393925 A1 12/2020 Chen et al.

FOREIGN PATENT DOCUMENTS

| KR | 10-1231613 | 2/2013 |
| KR | 10-1371327 | 3/2014 |
| KR | 10-1416581 | 8/2014 |
| KR | 10-2019-0103872 | 9/2019 |
| WO | 2019/171511 | 9/2019 |

* cited by examiner

DISPLAY DEVICE

CROSS-REFERENCE TO RELATED APPLICATION(S)

This U.S. non-provisional patent application claims priority to and the benefit of Korean Patent Application No. 10-2020-0075894 under 35 U.S.C. § 119, filed in the Korean Intellectual Property Office (KIPO) on Jun. 22, 2020, the entire contents of which are incorporated herein by reference.

BACKGROUND

The disclosure relates to a display device sensing an input from an electromagnetic pen.

Display devices may sense external inputs applied from the outside. The external inputs may be a user's inputs. The user's inputs may include external inputs of various types such as a portion of a user's body, light, heat, an electromagnetic pen, or pressure. In particular, the display devices may include a digitizer capable of sensing a touch input from an electromagnetic pen. The digitizer may be applied to the display devices in various forms by a method such as an electromagnetic resonance (EMR) method or an active electrostatic (AES) method.

SUMMARY

The disclosure relates to a display device capable of sensing inputs from an electromagnetic pen.

In an aspect, a display device may include a window including a glass substrate, a display panel disposed under the window, and a digitizer disposed under the display panel. The digitizer may include a base film disposed under the display panel, a first conductive layer disposed under the base film, a first insulating layer disposed under the first conductive layer, a second conductive layer disposed under the first insulating layer, and the second insulating layer disposed under the second conductive layer. The window, the display panel, and the digitizer may be capable of being folded and unfolded.

In an embodiment, a thickness of the first conductive layer may be greater than a thickness of the second conductive layer.

In an embodiment, the second conductive layer may include a first sub-conductive layer disposed under the first insulating layer, and a second sub-conductive layer disposed under the first sub-conductive layer.

In an embodiment, each of the first sub-conductive layer and the first insulating layer may include an opening, and the second sub-conductive layer may electrically contact the first conductive layer through the opening of each of the first sub-conductive layer and the first insulating layer.

In an embodiment, the first sub-conductive layer may directly contact the first insulating layer.

In an embodiment, the digitizer may further include an intermediate base film disposed between the second conductive layer and the first insulating layer.

In an embodiment, each of the base film and the intermediate base film may include a polyimide.

In an embodiment, each of the first insulating layer and the second insulating layer may include a pressure sensitive adhesive film.

In an embodiment, one of the first insulating layer or the second insulating layer may include a photosensitive polyimide, and the other of the first insulating layer or the second insulating layer may be a pressure sensitive adhesive film.

In an embodiment, the digitizer may further include a cover layer disposed under the second insulating layer.

In an embodiment, the number of layers of the second conductive layer may be greater than a number of layers of the first conductive layer.

In an embodiment, the display panel and the digitizer may be in-folded such that a first portion of the display panel and a second portion of the display panel face each other.

In an embodiment, the display panel may include a sensor layer sensing an external input from an outside of the display device, and a display layer disposed under the sensor layer and displaying an image. The display layer may be disposed between the sensor layer and the digitizer.

In an embodiment, the display device may further include a protective film disposed between the display panel and the digitizer, wherein the display panel may be attached to the protective film, and the base film of the digitizer may be attached to the protective film.

In an embodiment, the digitizer may include an upper surface and a lower surface, the upper surface of the digitizer may face the display panel, the lower surface of the digitizer may be spaced apart from the display panel, the upper surface of the digitizer is disposed between the display panel and the lower surface of the digitizer, and in an unfolded state, the upper surface of the digitizer may be flat, and the lower surface of the digitizer may be uneven.

In an aspect, a display device may include a sensor layer sensing an input from an outside of the display device, a display layer disposed under the sensor layer and displaying an image towards the sensor layer, and a digitizer disposed under the display layer and including an upper surface facing the display layer and a lower surface spaced apart from the display layer, wherein the upper surface of the digitizer may be disposed between the display layer and the lower surface of the digitizer, the upper surface of the digitizer may be flat, and the lower surface of the digitizer may be uneven.

In an embodiment, the digitizer may include a base film disposed under the display layer and adjacent to the upper surface of the digitizer, a first conductive layer disposed under the base film, a first insulating layer disposed under the first conductive layer, a second conductive layer disposed under the first insulating layer, and a second insulating layer disposed under the second conductive layer. The sensor layer, the display layer, and the digitizer may be capable of being folded and unfolded.

In an embodiment, the digitizer may further include an intermediate base film disposed between the second conductive layer and the first insulating layer.

In an embodiment, the second conductive layer may include a first sub-conductive layer contacting the intermediate base film, and a second sub-conductive layer disposed under the first sub-conductive layer, each of the first sub-conductive layer, the intermediate base film, and the first insulating layer may include an opening, and the second sub-conductive layer may contact the first conductive layer through the opening of each of the first sub-conductive layer, the intermediate base film, and the first insulating layer.

In an embodiment, each of the first insulating layer and the second insulating layer may include a pressure sensitive adhesive film or a photosensitive polyimide.

BRIEF DESCRIPTION OF THE DRAWINGS

An additional appreciation according to the embodiments of the invention will become more apparent by describing in detail some embodiments thereof with reference to the accompanying drawings, wherein.

DETAILED DESCRIPTION OF THE EMBODIMENTS

Figure 1A:
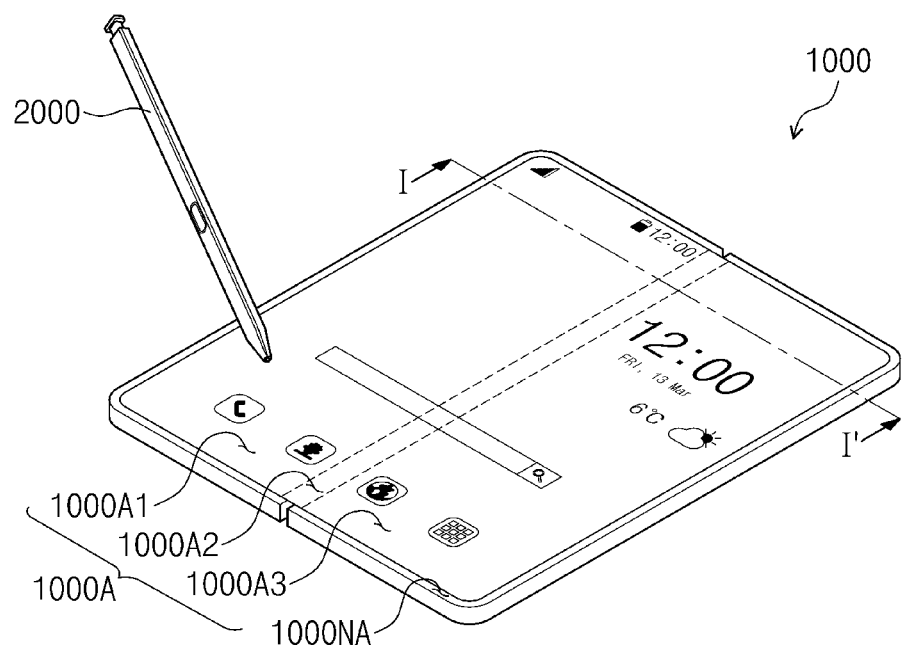
FIG. 1A is a schematic perspective view of a display device according to an embodiment.
Figure 1A:
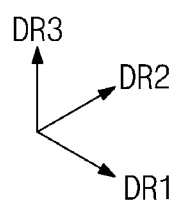

Since the disclosure may have diverse modified embodiments, some embodiments are illustrated in the drawings and are described in the detailed description of the invention. However, this does not limit the disclosure within specific embodiments and it should be understood that the disclosure covers all the modifications, equivalents, and replacements within the idea and technical scope of the invention.

Parts that are irrelevant to the description may be omitted to clearly describe the invention, and the same elements will be designated by the same reference numerals throughout the specification.

The thicknesses of some layers and areas may be exaggerated for convenience of explanation. In the drawings, the thickness of layers, films, panels, regions, etc., may be exaggerated for clarity.

It will be understood that when an element such as a layer, film, region, or substrate is referred to as being "on," "connected to," or "coupled to" another element, it can be directly on, or connected or coupled to the another element or intervening elements may also be present. In contrast, when an element is referred to as being "directly on" another element, there are no intervening elements present. The word "on" or "above" means positioned on or below the object portion and does not necessarily mean positioned on the upper side of the object portion based on a gravitational direction.

Unless explicitly described to the contrary, the word "comprise" or "include" and variations such as "comprises," "comprising," or "including" will be understood to imply the inclusion of stated elements but not the exclusion of any other elements.

The phrase "in a plan view" means viewing an object portion from the top, and the phrase "in a cross-sectional view" means viewing a cross-section of the object portion vertically cut from the side.

As used herein, the term "and/or" includes any and all combinations of one or more of the associated listed items. For example, "A and/or B" may be understood to mean "A, B, or A and B."

It will be understood that, although the terms "first," "second," etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the scope of the claims. The singular forms, "a," "an" and "the" are intended to include the plural forms as well, unless referred to the contrary.

In the specification and the claims, the phrase "at least one of" is intended to include the meaning of "at least one selected from the group of" for the purpose of its meaning and interpretation. For example, "at least one of A and B" may be understood to mean "A, B, or A and B."

Terms such as "below," "lower," "above," "upper," and the like are used to describe the relationship of the configurations shown in the drawings. The terms are used as a relative concept and are described with reference to the direction indicated in the drawings.

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

Hereinafter, embodiments of the disclosure will be described with reference to the accompanying drawings.

Figure 1B:
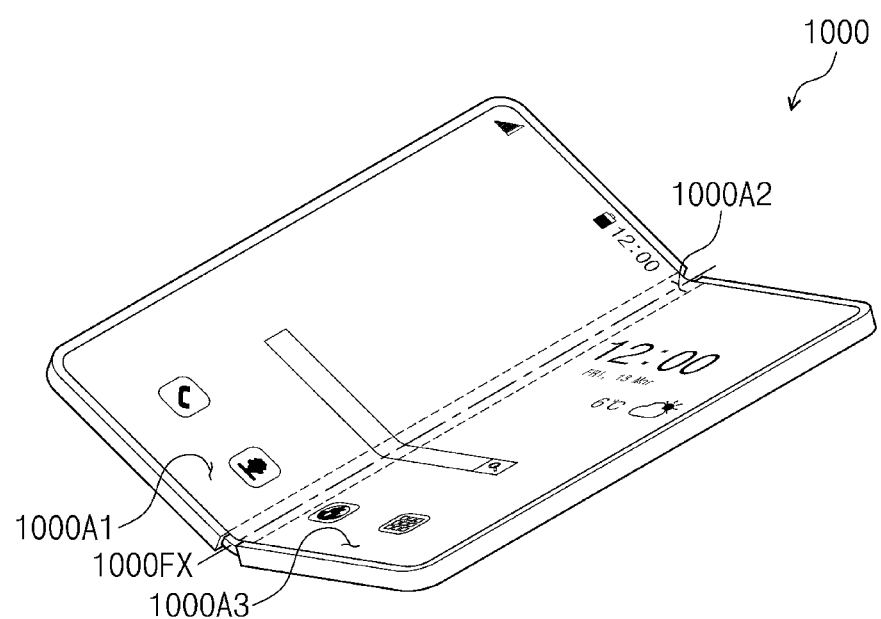
FIG. 1B is a schematic perspective view of a display device according to an embodiment.
Figure 1B:
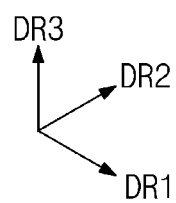

FIG. 1A is a schematic perspective view of a display device according to an embodiment. FIG. 1B is a schematic perspective view of a display device according to an embodiment.

Referring to FIGS. 1A and 1B, a display device 1000 may be a device activated by electrical signals. For example, the display device 1000 may be a mobile phone, a tablet, a car navigation unit, a game console, or a wearable device, but is not limited thereto. In FIGS. 1A and 1B, a mobile phone is illustrated as the display device 1000.

The display device 1000 may sense external inputs applied from the outside. The external inputs may be a user's inputs. The user's inputs may include various types of external inputs such as a portion of a user's body, light, heat, or pressure. In FIG. 1A, an electromagnetic pen 2000 is illustrated as an example. The display device 1000 may sense external inputs by electromagnetic resonance (EMR) generated between a magnetic field generated inside the display device 1000 and the electromagnetic pen 2000.

The display device 1000 may display an image through an active region 1000A. In case that the display device 1000 is unfolded, the active region 1000A may include a plane defined by a first direction DR1 and a second direction DR2. The thickness direction of the display device 1000 may be parallel to a third direction DR3 intersecting the first direction DR1 and the second direction DR2. Therefore, a front surface (or an upper surface) and a rear surface (or a lower surface) of members forming (or constituting) the display device 1000 may be defined with respect to the third direction DR3.

The active region 1000A may include a first region 1000A1, a second region 1000A2, and a third region 1000A3. The second region 1000A2 may be bent with respect to a folding axis 1000FX extending in the second direction DR2. Accordingly, the first region 1000A1 and the third region 1000A3 may be referred to as non-folding regions, and the second region 1000A2 may be referred to as a folding region.

In case that the display device 1000 is folded, the first region 1000A1 and the third region 1000A3 may face each other. Accordingly, in a fully folded state, the active region 1000A may not be exposed to the outside, which may be referred to as in-folding. However, the embodiments are not limited thereto.

For example, in an embodiment, in case that the display device 1000 is folded, the first region 1000A1 and the third region 1000A3 may oppose each other. Accordingly, in the folded state, the active region 1000A may be exposed to the outside, which may be referred to as out-folding.

The display device 1000 may perform only any one of in-folding or out-folding. As another example, the display device 1000 may perform both in-folding and out-folding. In this case, the same region of the display device 1000, for example, the second region 1000A2 may be in-folded and out-folded.

In FIGS. 1A and 1B, one folding region and two non-folding regions are illustrated as an example, but the number of folding regions and non-folding regions is not limited thereto. For example, the display device 1000 may include more than two non-folding regions and multiple folding regions disposed between adjacent non-folding regions.

FIGS. 1A and 1B illustrate, as an example, that a folding axis 1000FX extends in the second direction DR2, but the embodiments are not limited thereto. For example, the folding axis 1000FX may extend in the first direction DR1. In this case, the first region 1000A1, the second region 1000A2, and the third region 1000A3 may be sequentially arranged in the second direction DR2.

The active region 1000A may overlap at least one electronic module. For example, electronic modules may include a camera module and a proximity illuminance sensor (or light sensor). The electronic modules may receive an external input transmitted through the active region 1000A or may provide an output through the active region 1000A. A portion of the active region 1000A overlapping the camera module and the proximity illuminance sensor may have a higher transmittance than other portions of the active region 1000A. Accordingly, regions in which a plurality of electronic modules are to be disposed may not be in a peripheral region 1000NA around the active region 1000A. As a result, the area ratio of the active region 1000A to the total area of the display device 1000 may increase.

Figure 2A:
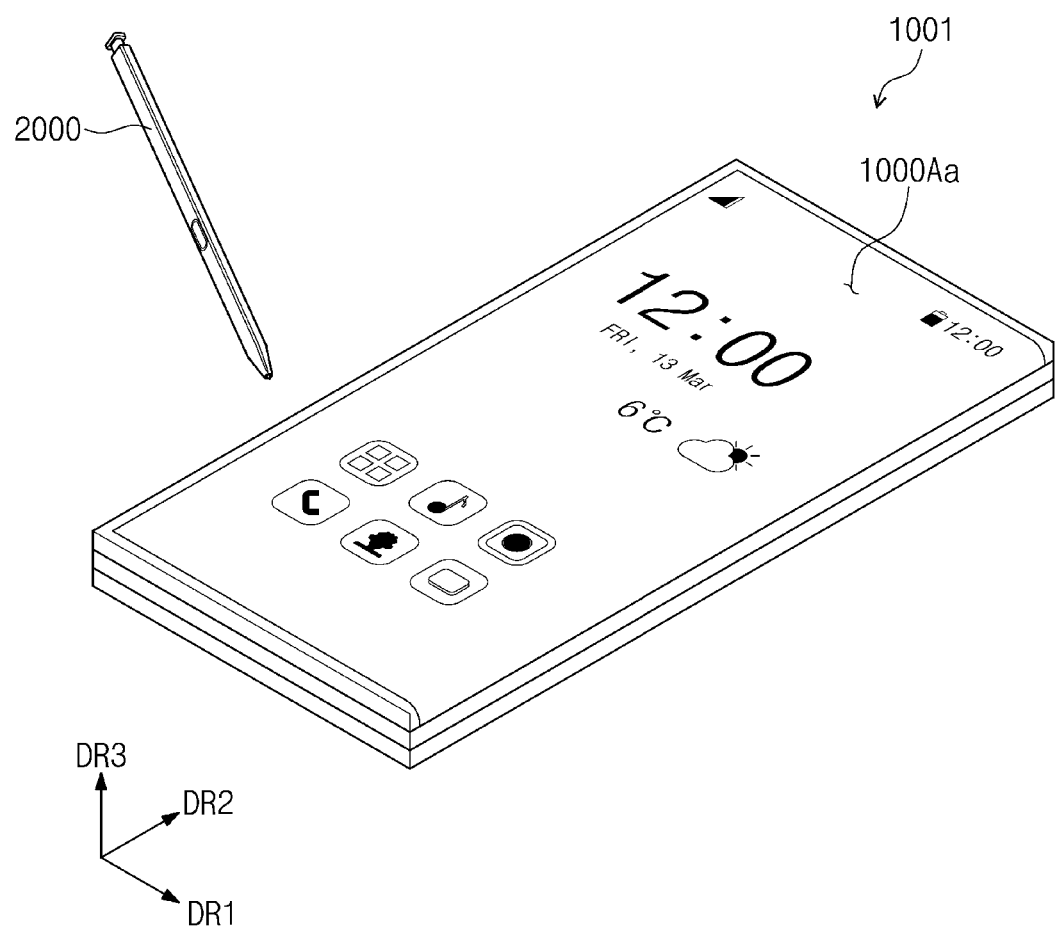
FIG. 2A is a schematic perspective view of a display device according to an embodiment.
Figure 2B:
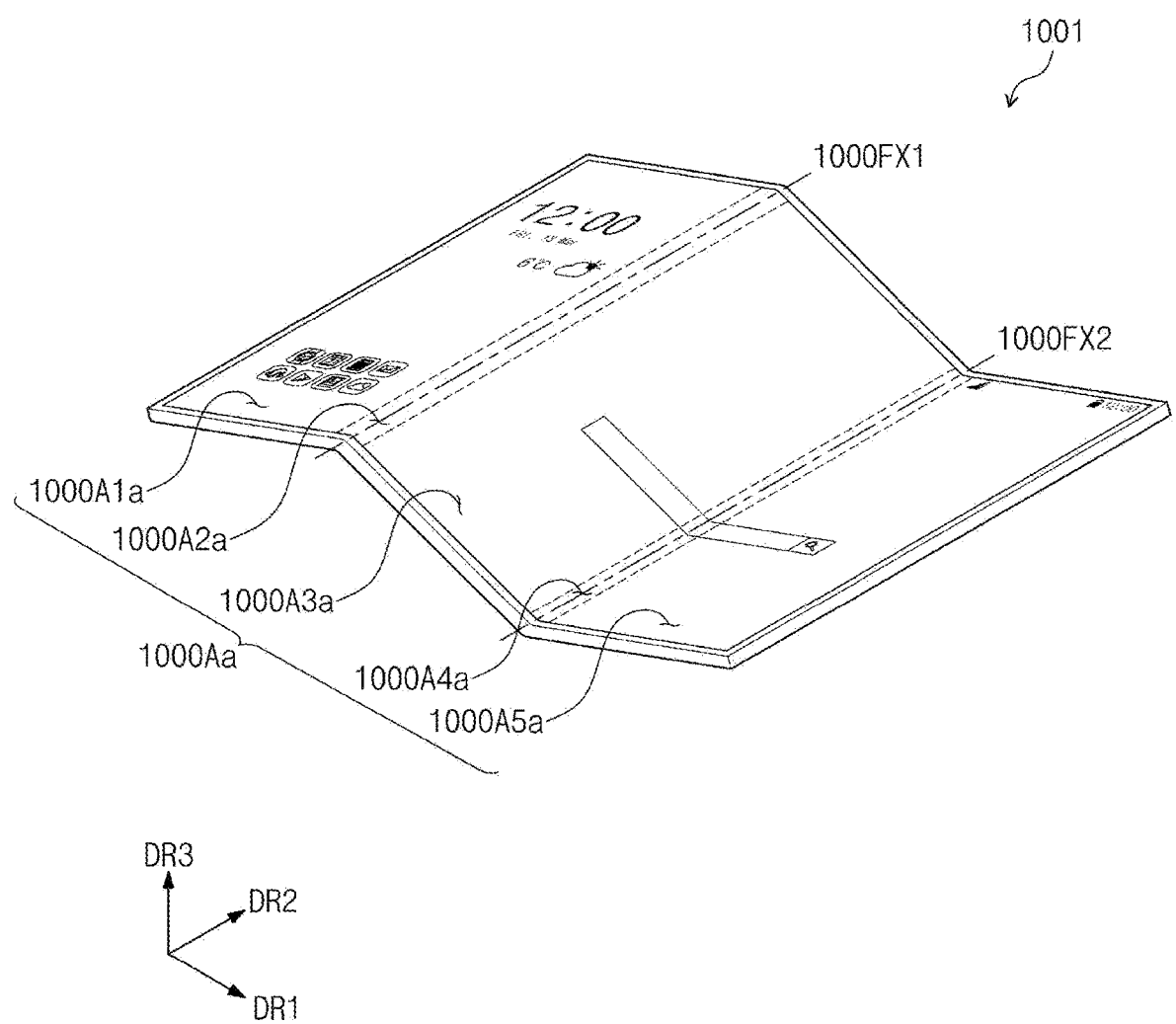
FIG. 2B is a schematic perspective view of a display device according to an embodiment.

FIG. 2A is a schematic perspective view of a display device according to an embodiment. FIG. 2B is a schematic perspective view of a display device according to an embodiment.

Referring to FIGS. 2A and 2B, a display device 1001 may be a foldable display device. The display device 1001 may display an image through an active region 1000Aa. The active region 1000Aa may include a first region 1000A1a, a second region 1000A2a, a third region 1000A3a, a fourth region 1000A4a, and a fifth region 1000A5a.

The second region 1000A2a may be bent with respect to a folding axis 1000FX1 extending in the second direction DR2. The fourth region 1000A4a may be curved with respect to a folding axis 1000FX2 extending in the second direction DR2. Accordingly, the first region 1000A1a, the third region 1000A3a, and the fifth region 1000A5a may be referred to as non-folding regions. The second region 1000A2a and the fourth region 1000A4a may be referred to as folding regions.

The second region 1000A2a may be out-folded, and the fourth region 1000A4a may be in-folded. Accordingly, as shown in FIG. 2A, in case that the display device 1001 is fully folded, the first region 1000A1a may be exposed to the outside, and the third region 1000A3a, the fourth region 1000A4a, and the fifth region 1000A5a may not be exposed to the outside.

Figure 3:
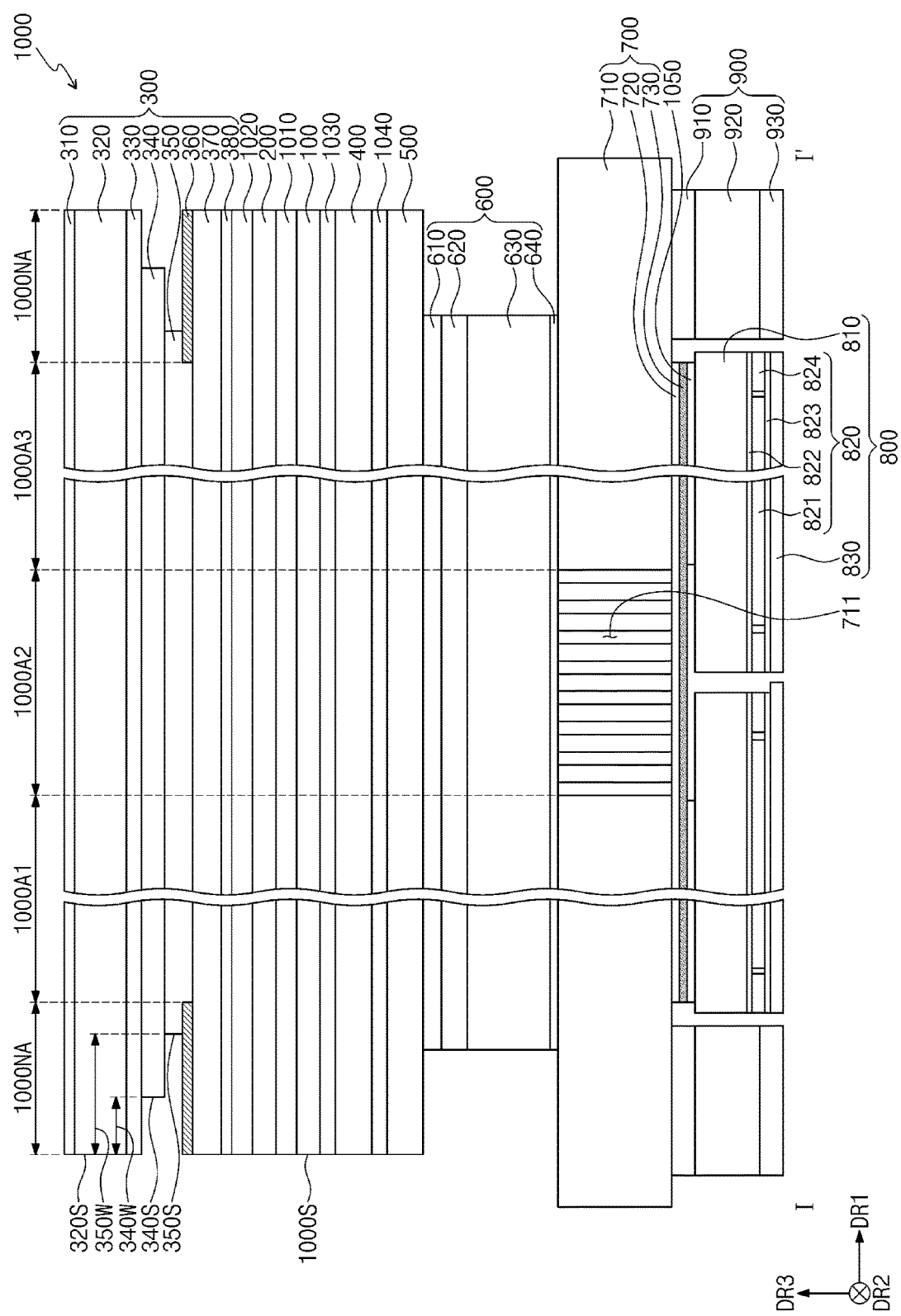
FIG. 3 is a schematic cross-sectional view taken along line I-I' of FIG. 1A.
Figure 4:
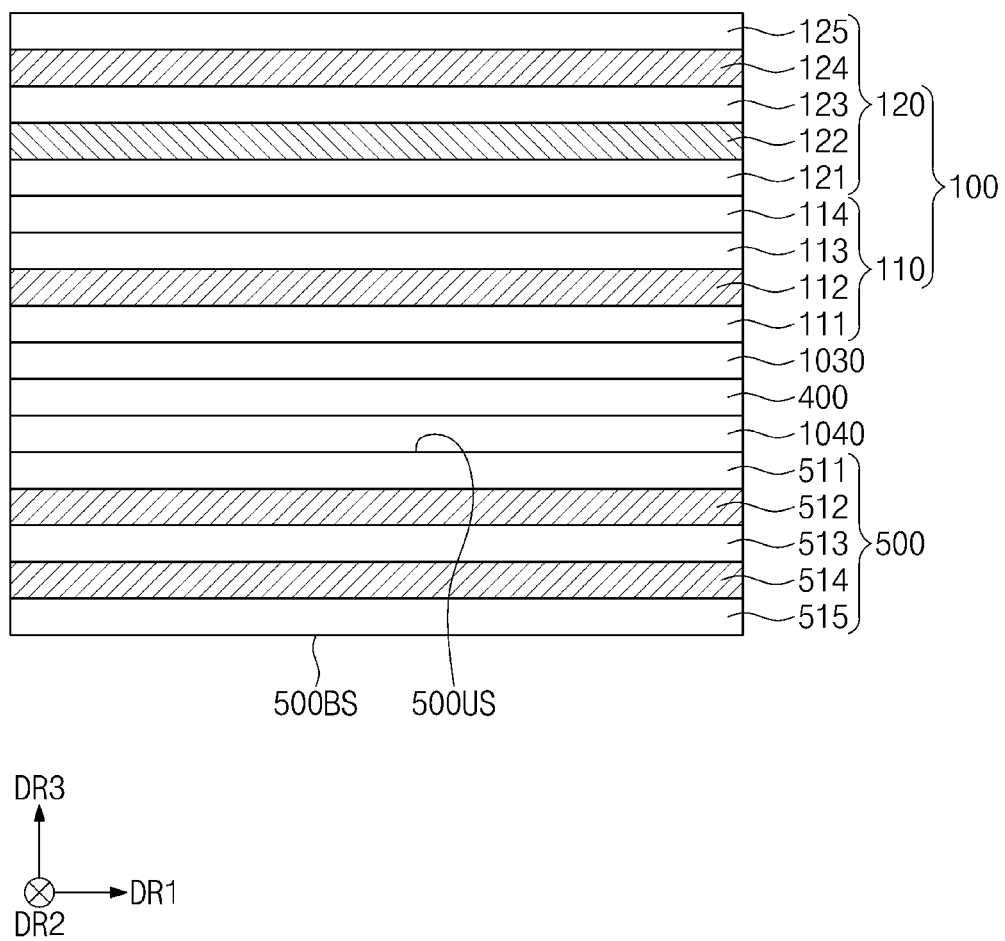
FIG. 4 is a schematic cross-sectional view of a part of the configuration of a display device according to an embodiment.

FIG. 3 is a schematic cross-sectional view taken along line I-I' of FIG. 1A. FIG. 4 is a schematic cross-sectional view of a part of the configuration of a display device according to an embodiment.

Referring to FIGS. 3 and 4, the display device 1000 may include a display panel 100, upper functional layers, and lower functional layers.

Referring to FIG. 4, the display panel 100 may be configured to generate an image and sense an external input applied from the outside. For example, the display panel 100 may include a display layer 110 and a sensor layer 120. The display layer 110 may be configured to generate an image. The display layer 110 may be a light emitting display layer. For example, the display layer 110 may be an organic light emitting display layer, a quantum dot display layer, a micro LED display layer, or a nano LED display layer.

The display layer 110 may include a base layer 111, a circuit layer 112, a light emitting element layer 113, and an encapsulation layer 114.

The base layer 111 may include a synthetic resin film. The synthetic resin layer may include a thermosetting resin. The base layer 111 may have a multi-layer structure. For example, the base layer 111 may have a three-layer structure including a synthetic resin layer, an adhesive layer, and a synthetic resin layer. The synthetic resin layer may be or comprise a polyimide-based resin layer, but the embodiments are not limited to a particular material. The synthetic resin layer may include at least any one among an acrylic-based resin, a methacrylate-based resin, polyisoprene, a vinyl-based resin, an epoxy-based resin, a urethane-based resin, a cellulose-based resin, a siloxane-based resin, a polyamide-based resin, or a perylene-based resin. The base layer 111 may include a glass substrate or an organic/inorganic composite material substrate.

The circuit layer 112 may be disposed on the base layer 111. The circuit layer 112 may include an insulating layer, a semiconductor pattern, a conductive pattern, and a signal line. The insulating layer, the semiconductor layer, and the conductive layer are formed on the base layer 111 by methods such as coating or vapor deposition, and then the insulating layer, the semiconductor layer, and the conductive layer may be selectively patterned by single or multiple photolithography processes. Thereafter, a semiconductor pattern, a conductive pattern, and a signal line included in the circuit layer 112 may be formed.

The light emitting element layer 113 may be disposed on the circuit layer 112. The light emitting element layer 113 may include a light emitting element. For example, the light emitting element layer 113 may include an organic light emitting material, a quantum dot, a quantum rod, or a micro-LED.

The encapsulation layer 114 may be disposed on the light emitting element layer 113. The encapsulation layer 114 may include an inorganic layer, an organic layer, and an inorganic layer that are sequentially stacked, but the layers constituting the encapsulation layer 114 are not limited thereto.

The inorganic layers may protect the light emitting element layer 113 from moisture and oxygen, and the organic layer may protect the light emitting element layer 113 from foreign substances such as dust particles. The inorganic layers may include a silicon nitride layer, a silicon oxy nitride layer, a silicon oxide layer, a titanium oxide layer, or an aluminum oxide layer. The organic layer may include an acrylic-based organic layer, but the embodiments are not limited thereto.

The sensor layer 120 may be disposed on the display layer 110. The sensor layer 120 may sense external inputs applied from the outside. The external inputs may be a user's inputs. For example, the user's inputs may include external inputs of various types such as a portion of a user's body, light, heat, pen, or pressure.

The sensor layer 120 may be formed on the display layer 110 by a continuous process. In this case, the sensor layer 120 may be directly disposed on the display layer 110. Being directly disposed may mean that a third component is not disposed between the sensor layer 120 and the display layer 110. For example, a separate adhesive member may not be disposed between the sensor layer 120 and the display layer 110. As another example, the sensor layer 120 may be bonded to the display layer 110 by an adhesive member. The adhesive member may include a conventional adhesive or a gluing agent.

The sensor layer 120 may include a base insulating layer 121, a first conductive layer 122, a sensing insulating layer 123, a second conductive layer 124, and a cover insulating layer 125.

The base insulating layer 121 may be directly disposed on the display layer 110. For example, the base insulating layer 121 may directly contact the encapsulation layer 114. The base insulating layer 121 may have a single layer structure or a multilayer structure. As another example, the base insulating layer 121 may be omitted. As another example, the base insulating layer 121 may be formed on a separate base layer, and the base layer may be bonded to the display layer 110 by an adhesive member.

Each of the first conductive layer 122 and the second conductive layer 124 may have a single layer structure or a multi-layer structure stacked in the third direction DR3. The single-layered conductive layer may include a metal layer or a transparent conductive layer. The metal layer may include at least any one among molybdenum, silver, titanium, copper, aluminum, and an alloy thereof. The transparent conductive layer may include a transparent conductive oxide such as indium tin oxide (ITO), indium zinc oxide (IZO), zinc oxide (ZnO), or indium tin zinc oxide (ITZO). The transparent conductive layer may include a conductive polymer such as PEDOT, a metal nanowire, graphene, etc.

The multi-layered conductive layer may include multi-layered metal layers. For examples, a multi-layered metal layers may have a three-layer structure of, for example, titanium/aluminum/titanium. The multi-layered conductive layer may include at least one metal layer and at least one transparent conductive layer.

Each of the first conductive layer 122 and the second conductive layer 124 may include patterns forming sensing electrodes. The sensor layer 120 may obtain information on an external input by changes in capacitance between the sensing electrodes.

The sensing insulating layer 123 may be disposed between the first conductive layer 122 and the second conductive layer 124 and may cover or overlap the first conductive layer 122. At least a part of the second conductive layer 124 may be electrically connected to at least a part of the first conductive layer 122 through a contact hole penetrating the sensing insulating layer 123. The cover insulating layer 125 may be disposed on the sensing insulating layer 123 and may cover or overlap the second conductive layer 124.

At least any one among the base insulating layer 121, the sensing insulating layer 123, and the cover insulating layer 125 may include an inorganic film. The inorganic film may include at least one of aluminum oxide, titanium oxide, silicon oxide, silicon oxynitride, zirconium oxide, and hafnium oxide.

At least one of the base insulating layer 121, the sensing insulating layer 123, and the cover insulating layer 125 may include an organic film. The organic film may include at least one of an acrylic-based resin, a methacrylic-based resin, polyisoprene, a vinyl-based resin, an epoxy-based resin, a urethane-based resin, a cellulose-based resin, a siloxane-based resin, a polyimide-based resin, a polyamide-based resin, and a perylene-based resin.

Referring back to FIG. 3, the upper functional layers may be disposed on the display panel 100. The upper functional layers may include an anti-reflection member 200 and an upper member 300.

The anti-reflection member 200 may be referred to as an anti-reflection layer. The anti-reflection member 200 may reduce the reflectance of external light incident from the outside. The anti-reflection member 200 may include a stretched synthetic resin film. For example, the anti-reflection member 200 may be provided by dyeing an iodine compound on a polyvinyl alcohol film (PVA film). However, this is presented as an example, and the material constituting the anti-reflection member 200 is not limited to the example described above.

The anti-reflection member 200 may be bonded to the display panel 100 by a first adhesive layer 1010. The first adhesive layer 1010 may be a transparent adhesive layer such as a pressure sensitive adhesive film (PSA), an optically clear adhesive film (OCA), or an optically clear adhesive resin (OCR). An adhesive layer that will be described below may include a conventional adhesive or a gluing agent. In another embodiment, the first adhesive layer 1010 may be omitted, and in this case, the anti-reflection member 200 may be directly disposed on the display panel 100. In this case, a separate adhesive layer may not be disposed between the anti-reflection member 200 and the display panel 100.

The upper member 300 may be disposed on the anti-reflection member 200. The upper member 300 may include a first hard coating layer 310, a protective layer 320, a first upper adhesive layer 330, a window 340, a second upper adhesive layer 350, a light blocking layer 360, a shock absorbing layer 370, and a second hard coating layer 380. Components included in the upper member 300 are not limited to the components described above. At least some of the components described above may be omitted, and other components may be added.

The first hard coating layer 310 may be disposed on an outermost surface of the display device 1000. The first hard coating layer 310 may be a functional layer for improving use characteristics of the display device 1000 and may be coated on the protective layer 320. For example, the first hard coating layer 310 may enhance anti-fingerprint, anti-pollution, and scratch-resistant characteristics. The thickness of the first hard coating layer 310 may be about 3 μm to about 7 μm, and may be, for example, about 5 μm, but the thickness of the first hard coating layer 310 is not limited thereto.

The protective layer 320 may be disposed under the first hard coating layer 310. The protective layer 320 may protect components disposed under the protective layer 320. The protective layer 320 may be additionally provided with the first hard coating layer 310 and an anti-fingerprint layer to improve properties such as chemical resistance and abrasion resistance. The protective layer 320 may include a film having an elastic modulus of about 15 GPa or less at room temperature. For example, the protective layer 320 may include a polyethylene terephthalate film. The thickness of the protective layer 320 may be about 40 μm to about 60 μm, and may be, for example, about 50 μm. However, the thickness of the protective layer 320 is not limited thereto.

The first upper adhesive layer 330 may be disposed under the protective layer 320. The protective layer 320 and the window 340 may be bonded to each other by the first upper adhesive layer 330.

The window 340 may be disposed under the first upper adhesive layer 330. The window 340 may include an optically transparent insulating material. For example, the window 340 may include a glass substrate or a synthetic resin film.

In case that the window 340 is a glass substrate, the thickness of the window 340 may be about 80 μm or less, for example, about 30 μm, but the thickness of the window 340 is not limited thereto. In case that the window 340 is a synthetic resin film, the window 340 may include a polyimide (PI) film or a polyethylene terephthalate (PET) film.

The window 340 may have either a multi-layer structure or a single layer structure. For example, the window 340 may include multiple synthetic resin films bonded by an adhesive, or a glass substrate and a synthetic resin film, which are bonded by an adhesive.

Although not shown, a functional layer may be further disposed on one surface of the window 340. For example, the functional layer may be disposed between the window 340 and the first upper adhesive layer 330. The functional layer may be a hard coating layer. However, the embodiments are not limited thereto, and the functional layer may include an anti-fingerprint layer, an anti-scattering layer, etc. The thickness of the functional layer may be about 3 μm to about 7 μm, and may be, for example, about 5 μm. However, the thickness of the functional layer is not limited thereto.

The second upper adhesive layer 350 may be disposed under the window 340. The window 340 and the shock absorbing layer 370 may be bonded to each other by the second upper adhesive layer 350.

In an embodiment, a sidewall 340S of the window 340 and a sidewall 350S of the second upper adhesive layer 350 may be disposed inwardly from the sidewalls of other layers, for example, a sidewall 1000S of the display panel 100 and a sidewall 320S of the protective layer 320. An object "disposed inwardly" may indicate the object being closer to the active region 1000A than other objects.

The folding operation of the display device 1000 may change the positional or structural relationship among respective layers. According to an embodiment, the sidewall 340S of the window 340 is disposed inwardly from the sidewall 1000S of the display panel 100 and the sidewall 320S of the protective layer 320, and thus even in case that the positional relationship changes, the chances that the sidewall 340S of the window 340 protrudes further than the sidewall 320S of the protective layer 320 may be reduced. Therefore, the chances that external impacts are delivered through the sidewall 340S of the window 340 may be reduced. As a result, the chances of the window 340 having cracks may be reduced.

A first distance 340W between the sidewall 340S of the window 340 and the sidewall 320S of the protective layer 320 may be greater than or equal to a predetermined distance. In this case, the first distance 340W may be parallel to the first direction DR1. The first distance 340W may correspond to the distance between the sidewall 340S and the sidewall 320S in a plan view.

The first distance 340W may be about 180 μm to about 205 μm, for example, about 196 μm, but the embodiments are not limited thereto. For example, the first distance 340W may be about 50 μm or greater, or about 300 μm. As the first distance 340W becomes greater, the protective layer 320 protrudes further than the window 340, and a part of the protective layer 320 is bent to be attached to other components, for example, a case. As the area of the protective layer 320 becomes larger, the chances that foreign substances flowing from an upper portion of the protective layer 320 are introduced into a lower portion of the protective layer 320 may be reduced.

The window 340 and the second upper adhesive layer 350 may be bonded to the shock absorbing layer 370 by a lamination process. In consideration of the lamination process tolerance, the areas of the window 340 and the second upper adhesive layer 350 may be smaller than the area of the shock absorbing layer 370. The area of the second upper adhesive layer 350 may be smaller than the area of the window 340. For example, pressure may be applied to the second upper adhesive layer 350 in the process of attaching the window 340. The second upper adhesive layer 350 may expand in the first and second directions DR1 and DR2 under pressure. In this case, the area of the second upper adhesive layer 350 may be smaller than or equal to the area of the window 340 to prevent the second upper adhesive layer 350 from protruding further than the window 340.

In case that the first upper adhesive layer 330 and the second upper adhesive layer 350 are attached, the window 340 is not slipped in the folding operation of the display device 1000, and thus a buckling phenomenon may occur in the window 340. However, according to an embodiment, the area of the second upper adhesive layer 350 is smaller than the area of the window 340. Accordingly, the first upper adhesive layer 330 may not be attached to the second upper adhesive layer 350, and thus the chances of foreign matter sticking to the second upper adhesive layer 350 may be reduced.

A second distance 350W between the sidewall 350S of the second upper adhesive layer 350 and the sidewall 320S of the protective layer 320 may be greater than or equal to a predetermined distance. In this case, the second distance 350W may be parallel to the first direction DR1. The second distance 350W may correspond to the distance between the sidewall 350S and the sidewall 320S in a plan view.

The second distance 350W may be about 392 μm, but embodiments are not limited thereto. For example, the second distance 350W may be selected from a range of about 292 μm to about 492 μm but is not limited to this range.

The shock absorbing layer 370 may be a functional layer for protecting the display panel 100 from external impacts.

The shock absorbing layer 370 may be selected from films having an elastic modulus of about 1 GPa or greater at room temperature. The shock absorbing layer 370 may be a stretched film including an optical function. For example, the shock absorbing layer 370 may be an optical axis control film. For example, the shock absorbing layer 370 may be a biaxially stretched PET film. The thickness of the shock absorbing layer 370 may be about 35 µm to about 45 µm, for example, about 41 µm, but the thickness of the shock absorbing layer 370 is not limited thereto. In an embodiment, the shock absorbing layer 370 may be omitted.

The second hard coating layer 380 may be provided on a surface of the shock absorbing layer 370. The second hard coating layer 380 may include an organic coating agent, an inorganic coating agent, or an organic/inorganic mixed coating agent. The embodiments are not limited to specific materials for the second hard coating layer 380 as long as the material is capable of reducing haze. Haze may be defined by a degree to which light incident on a substrate is diffused. A high degree of haze may indicate that light is scattered to cause an opaque blur phenomenon.

The light blocking layer 360 may be disposed between the shock absorbing layer 370 and the second upper adhesive layer 350. The light blocking layer 360 may be printed on an upper surface of the shock absorbing layer 370 to be provided. The light blocking layer 360 may overlap a peripheral region 1000NA. The light blocking layer 360 is a colored layer and may be formed by a coating method. The light blocking layer 360 may include a polymer resin and a pigment mixed with a polymer resin. The polymer resin may be, for example, an acrylic-based resin or polyester, and the pigment may be a carbon-based pigment. However, the embodiments are not limited thereto.

The light blocking layer 360 may be printed after the second hard coating layer 380 is formed on the shock absorbing layer 370. The shock absorbing layer 370 may include a more uneven surface than the second hard coating layer 380, and thus adhesion may be better in case that the light blocking layer 360 is printed on the shock absorbing layer 370 than in case that the light blocking layer 360 is printed on the second hard coating layer 380. For example, as the light blocking layer 360 is directly printed on the uneven surface of the shock absorbing layer 370, the chances that the light blocking layer 360 is separated from the shock absorbing layer 370 may be reduced. For example, the chances that the light blocking layer 360 is separated from a surface to be printed, for example, the shock absorbing layer 370, are reduced, and thus product reliability of the display device 1000 may be improved. However, the location of the light blocking layer 360 is not limited to the example shown in FIG. 3.

The upper member 300 may be bonded to the anti-reflection member 200 by a second adhesive layer 1020. The second adhesive layer 1020 may include a conventional adhesive or a gluing agent.

The lower functional layers may be disposed under the display panel 100. For example, the lower functional layers may include a lower protective film 400, a digitizer 500, a cushion member 600, a first lower member 700, a second lower member 800, and a step compensation member 900. Components included in the lower functional layers are not limited to the components described above. For example, at least some of the components described above may be omitted, and other components may be added.

The lower protective film 400 may be bonded to a rear surface of the display panel 100 by a third adhesive layer 1030. The lower protective film 400 may prevent scratches on the rear surface of the display panel 100 during the manufacturing process of the display panel 100. The lower protective film 400 may be a colored polyimide film. For example, the lower protective film 400 may be an opaque yellow film, but the embodiments are not limited thereto.

The digitizer 500 may be bonded to a rear surface of the lower protective film 400 by a fourth adhesive layer 1040. The digitizer 500 may sense signals transmitted through the electromagnetic pen 2000 (see FIG. 1A) among external inputs. The digitizer 500 may sense external inputs by electromagnetic resonance (EMR).

Referring to FIG. 4, the digitizer 500 may include a base film 511, a first conductive layer 512, a first insulating layer 513, a second conductive layer 514, and a second insulating layer 515. The base film 511, the first conductive layer 512, the first insulating layer 513, the second conductive layer 514, and the second insulating layer 515 may be sequentially stacked in a direction away from the display panel 100.

According to an embodiment, the base film 511 may directly contact the fourth adhesive layer 1040 of the digitizer 500. In case that the display device 1000 is unfolded, the base film 511 may have a flat surface. For example, an upper surface 500US of the digitizer 500 may be flat, and a lower surface 500BS of the digitizer 500 may have an uneven shape.

One of the outermost surfaces of the digitizer 500 is the flat base film 511, and thus the digitizer 500 may be attached to the fourth adhesive layer 1040 without an additional separate planarization process. Therefore, there may be no increase in the thickness of the digitizer 500 because of an additional planarization layer. The first conductive layer 512 and the second conductive layer 514 are spaced apart from the display panel 100 with the base film 511 therebetween, and thus lines included in the first conductive layer 512 and the second conductive layer 514 may be less visible. Detailed descriptions will be provided below.

Referring back to FIG. 3, the cushion member 600 may be disposed under the digitizer 500. The cushion member 600 may protect the display panel 100 from impacts delivered from the bottom. The cushion member may enhance impact resistance of the display device 1000.

The cushion member 600 may include a first cushion adhesive layer 610, a barrier film 620, a cushion layer 630, and a second cushion adhesive layer 640. Components included in the cushion member 600 are not limited to the components described above. For example, at least some of the components described above may be omitted, and other components may be added.

The first cushion adhesive layer 610 and the second cushion adhesive layer 640 may include a conventional adhesive or a gluing agent. The first cushion adhesive layer 610 may be attached to the digitizer 500, and the second cushion adhesive layer 640 may be attached to the first lower member 700. The barrier film 620 may be provided to enhance impact resistance. The barrier film 620 may serve to prevent deformation of the display panel 100. The barrier film 620 may be a synthetic resin film, for example, a polyimide film, but the embodiments are not limited thereto. The cushion layer 630 may include, for example, foam or a sponge. The foam may include polyurethane foam or thermoplastic polyurethane foam. In case that the cushion layer 630 includes the foam, the cushion layer 630 may be formed by using the barrier film 620 as a base layer. For example, a foaming agent is applied onto the barrier film 620 to form the cushion layer 630.

At least any one of the barrier film 620 and the cushion layer 630 may have a light-absorbing color. For example, at least any one of the barrier film 620 and the cushion layer 630 may be black. In this case, components disposed under the cushion member 600 may not be visible from the outside.

The first lower member 700 may be disposed under the cushion member 600. The first lower member 700 may include a plate 710, a lower adhesive layer 720, and a cover layer 730. Components included in the first lower member 700 are not limited to the components described above. For example, at least some of the components described above may be omitted, and other components may be added.

The plate 710 may include a material having an elastic modulus of about 70 GPa or greater at room temperature. For example, the plate 710 may include SUS304, but the embodiments are not limited thereto. The plate 710 may support components disposed on an upper portion. The plate 710 may improve heat dissipation performance of the display device 1000.

An opening 711 may be defined in a portion of the plate 710. The opening 711 may be defined in a region overlapping the second region 1000A2. For example, in a plan view or when viewed in the third direction DR3, the opening 711 may overlap the second region 1000A2. At least a portion of the plate 710 may be more readily bent or deformed because of the opening 711.

The cover layer 730 may be attached to the plate 710 by the lower adhesive layer 720. The lower adhesive layer 720 may include a conventional adhesive or a gluing agent. The cover layer 730 may cover or overlap the opening 711 of the plate 710. Accordingly, introduction of foreign substances into the opening 711 may be additionally prevented.

The cover layer 730 may include a material having an elastic modulus lower than that of the plate 710. For example, the cover layer 730 may include thermoplastic polyurethane, but the embodiments are not limited thereto.

The second lower members 800 may be disposed under the first lower member 700. The second lower members 800 may be spaced apart from each other. For example, a second lower member 800 may be disposed in the first region 1000A1, and another second lower member 800 may be disposed in the third region 1000A3.

Each of the second lower members 800 may be attached to the first lower member 700 by fifth adhesive layers 1050. For example, a fifth adhesive layer 1050 may be attached to a lower surface of the first lower member 700 overlapping the first region 1000A1, and the other fifth adhesive layer 1050 may be attached to a lower surface of the first lower member 700 overlapping the third region 1000A3. For example, the fifth adhesive layers 1050 may not overlap the second region 1000A2.

Although not shown, a step compensation film may be further disposed between each of the second lower members 800 and the first lower member 700. For example, the step compensation film may be provided in a region overlapping the second region 1000A2. The adhesion of a surface of the step compensation film may be lower than that of the other surface. For example, the surface may not have adhesion. The one surface may be a surface facing the first lower member 700.

Each of the second lower members 800 may include a lower plate 810, a heat dissipation sheet 820, and an insulating film 830. Components included in each of the second lower members 800 are not limited to the components described above. For example, at least some of the components described above may be omitted, and other components may be added.

Multiple lower plates 810 may be provided. One of the lower plates 810 may overlap a portion of the first region 1000A1 and the second region 1000A2, and another of the lower plates 810 may overlap another portion of the second region 1000A2 and the third region 1000A3.

The lower plates 810 may be spaced apart from each other in the second region 1000A2. However, the lower plates 810 may be disposed as close as possible to support a region in which the opening 711 of the plate 710 is formed. For example, the lower plates 810 may prevent the shape of the region in which the opening 711 of the plate 710 is defined from being deformed because of pressure applied from the top.

The lower plates 810 may prevent the shape of the components disposed on the second lower members 800 from being deformed because of the configuration disposed below the second lower members 800.

Each of the lower plates 810 may include a metal alloy. For example, each of the lower plates 810 may include a copper alloy. However, the material forming (or constituting) the lower plates 810 is not limited thereto. The heat dissipation sheet 820 may be attached under the lower plate 810. The heat dissipation sheet may be a heat conduction sheet having a high thermal conductivity. For example, the heat dissipation sheet 820 may include a heat dissipation layer 821, a first heat dissipation adhesive layer 822, a second heat dissipation adhesive layer 823, and a gap tape 824.

The gap tape 824 may be attached to the first heat dissipation adhesive layer 822 and the second heat dissipation adhesive layer 823, which are spaced apart from each other by the heat dissipation layer 821 therebetween. The gap tape 824 may have multiple layers. For example, the gap tape 824 may include a base layer, an upper adhesive layer disposed on an upper surface of the base layer, and a lower adhesive layer disposed on a lower surface of the base layer.

The heat dissipation layer 821 may be attached to the lower plate 810 by the first heat dissipation adhesive layer 822. The heat dissipation layer 821 may be sealed by the first heat dissipation adhesive layer 822, the second heat dissipation adhesive layer 823, and the gap tape 824. The heat dissipation layer 821 may be a graphitized polymer film. The polymer film may be, for example, a polyimide film. The insulating film 830 may be attached under the heat dissipation sheet 820. For example, the insulating film 830 may be attached to the second heat dissipation adhesive layer 823. The insulating film 830 may prevent the rattling in the display device 1000.

The step compensation member 900 may be attached under the plate 710. For example, the lower adhesive layer 720 may be attached under a portion of the plate 710, and the step compensation member 900 may be attached under another portion of the plate 710.

The step compensation member 900 may include a first compensation adhesive layer 910, a step compensation film 920, and a second compensation adhesive layer 930. The first compensation adhesive layer 910 may be attached to the lower surface of the plate 710. The step compensation film 920 may be a synthetic resin film. The second compensation adhesive layer 930 may be attached to a lower surface of the step compensation film 920 and a set (not shown).

Figure 5:
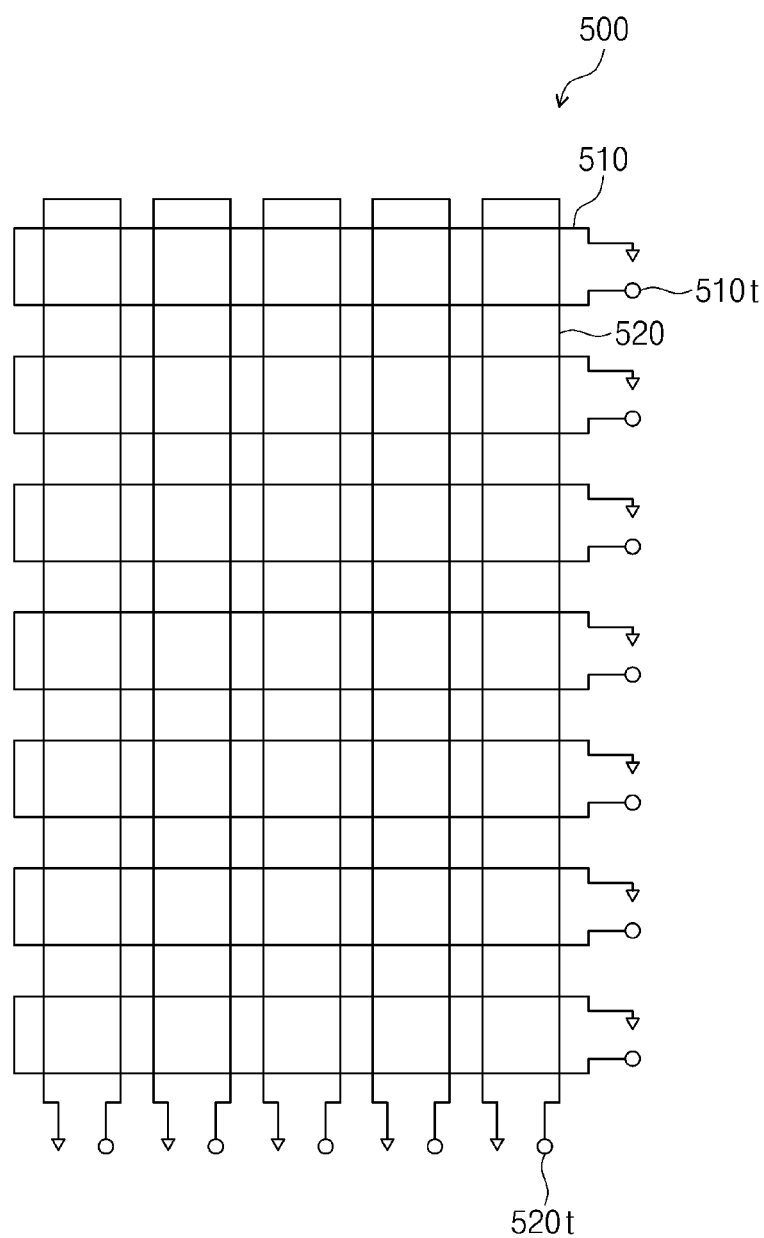
FIG. 5 is a schematic plan view briefly illustrating a configuration of a digitizer according to an embodiment.

FIG. 5 is a schematic plan view illustrating the configuration of a digitizer according to an embodiment.

Referring to FIG. 5, the digitizer 500 may include first coils 510 and second coils 520. The first coils 510 may be referred to as driving coils, and the second coils 520 may be referred to as sensing coils.

Each of the first coils 510 may extend in the first direction DR1, and the first coils 510 may be arranged to be spaced apart from each other in the second direction DR2. Each of the second coils 520 may extend in the second direction DR2, and the second coils 520 may be arranged to be spaced apart from each other in the first direction DR1.

AC signals may be sequentially provided or applied to the first terminals 510t of the first coils 510. The first coils 510 are formed in the form of a closed curve, and in case that a current flows through the first coils 510, a magnetic line of force may be induced between the first coils 510 and the second coils 520. The second coils 520 may sense the induced electromagnetic force emitted from the electromagnetic pen 2000 (see FIG. 1A) to the second terminals 520t of the second coils 520 and may output signals.

FIG. 5 illustrates the configuration of a digitizer 500 as an example, but the embodiments are not limited thereto. The structural relationship between the first coils 510 and the second coils 520 is not limited to that shown in FIG. 5 and may be variously modified.

Figure 6:
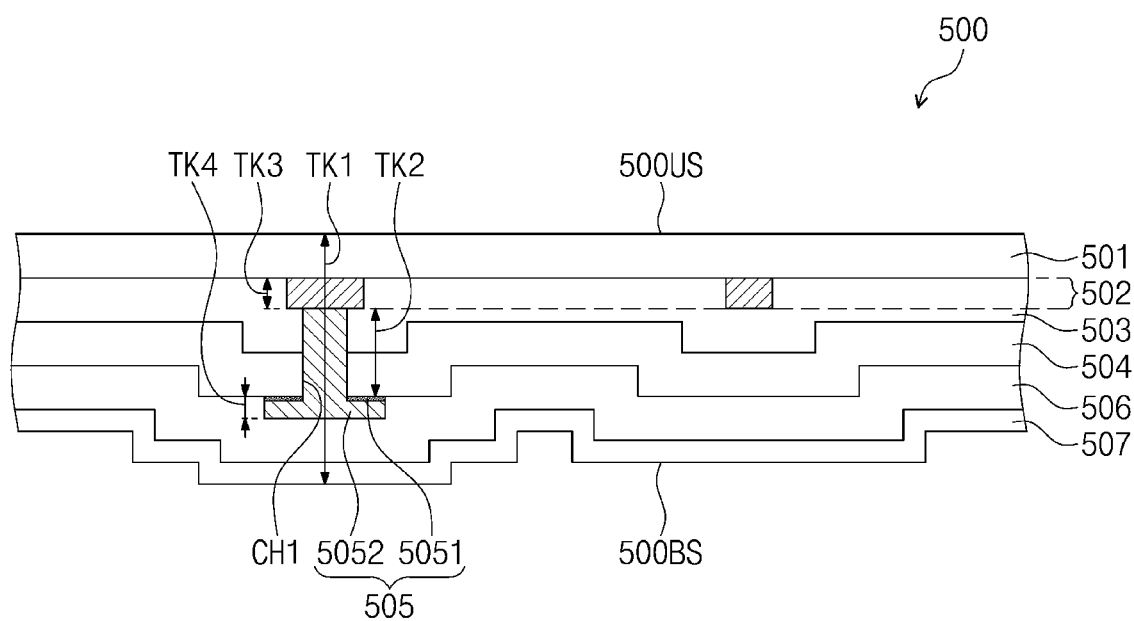
FIG. 6 is a schematic cross-sectional view of a digitizer according to an embodiment.

FIG. 6 is a schematic cross-sectional view of a digitizer according to an embodiment.

Referring to FIGS. 5 and 6, the digitizer 500 may include a base film 501, a first conductive layer 502, a first adhesive layer 503, an intermediate base film 504, a second conductive layer 505, a second adhesive layer 506, and a cover layer 507.

The thickness TK1 of the digitizer 500 may refers to a maximum thickness among thicknesses in a direction parallel to the third direction DR3. The thickness TK1 of the digitizer 500 may correspond to the distance between the upper surface 500US and the lower surface 500BS.

According to an embodiment, components forming the digitizer 500 may be sequentially stacked on a surface of the base film 501. Accordingly, one of the outermost surfaces of the digitizer 500 may be defined by a surface of the base film 501. For example, the upper surface 500US of the digitizer 500 may be defined by a surface of the base film 501, and the lower surface 500BS of the digitizer 500 may be defined by a surface of the cover layer 507.

Therefore, according to an embodiment, when attaching the digitizer 500 to the display panel 100 (see FIG. 4), the base film 501 may be attached to face the display panel 100 (see FIG. 4). A surface of the digitizer 500, for example, the upper surface 500US, is flat, and thus a planarization process for the digitizer 500 may be omitted. Accordingly, in case that the display device 1000 is repeatedly folded, a buckling phenomenon caused by a planarization layer may be prevented. As the planarization layer is omitted, the thickness TK1 of the digitizer 500 may be reduced to improve folding performance and a reliability issue of the display device 1000 (see FIG. 1A), which may be caused due to an increase in the thickness TK1 of the digitizer 500 may be reduced.

Both the first conductive layer 502 and the second conductive layer 505 may be disposed under the base film 501. Both the first conductive layer 502 and the second conductive layer 505 may be spaced apart from the display panel 100 (see FIG. 4) with the base film 501 therebetween. Accordingly, in case that the planarization layer is omitted, the first conductive layer 502 and the second conductive layer 505 may be less visible (or not be visible) when viewed from the outside of the display device 1000 (see FIG. 1A).

The first conductive layer 502 may include copper, but the embodiments are not limited thereto. The first conductive layer 502 may include multiple first conductive patterns. Some of the first conductive patterns may form the first coils 510 (see FIG. 5), and other first conductive patterns may form the second coils 520 (see FIG. 5). As another example, all of the first conductive patterns may be configured to be included in the first coils 510 (see FIG. 5) or may be configured to be included in the second coils 520 (see FIG. 5).

The first adhesive layer 503 may be disposed under the base film 501 and may overlap the first conductive layer 502. The first adhesive layer 503 may be a pressure sensitive adhesive film (PSA). The intermediate base film 504 may overlap the first adhesive layer 503. The intermediate base film 504 and the base film 501 may be (or include) a polyimide film. The first adhesive layer 503 and the intermediate base film 504 may be referred to as a first insulating layer.

The second conductive layer 505 may be disposed under the intermediate base film 504. The second conductive layer 505 may include a first sub-conductive layer 5051 and a second sub-conductive layer 5052. The number of layers of the second conductive layer 505 may be greater than the number of layers of the first conductive layer 502. Both the first sub conductive layer 5051 and the second sub conductive layer 5052 may include copper, but the embodiments are not limited thereto.

The first sub-conductive layer 5051, the intermediate base film 504, and the first adhesive layer 503 may be a flexible copper clad lamination (FCCL). The second sub-conductive layer 5052 may be a conductive layer plated on the first sub-conductive layer 5051.

The second conductive layer 505 may include second conductive patterns. Some of the second conductive patterns may be electrically connected to the first conductive pattern disposed on the first conductive layer 502. For example, some of the second conductive patterns may form the first coils 510 (see FIG. 5), and may be electrically connected to a pattern forming the first coils 510 (see FIG. 5) among the first conductive patterns.

An opening CH1 may be defined in the first sub-conductive layer 5051, the first adhesive layer 503, and the intermediate base film 504. A portion of the first conductive layer 502 may be exposed in or through the opening CH1. A portion of the second sub-conductive layer 5052 may fill in the opening CH1. The second sub-conductive layer 5052 may electrically contact the first conductive layer 502.

According to an embodiment, the intermediate base film 504 is disposed between the first sub-conductive layer 5051 and the first adhesive layer 503. The intermediate base film 504 may reduce the chances of the first sub-conductive layer 5051 corroding.

In case that the display device 1000 (see FIG. 1A) is in-folded, a first portion of the display panel 100 (see FIG. 3) and a second portion of the display panel 100 (see FIG. 3) may face each other. The first portion of the display panel 100 (see FIG. 3) may be a portion overlapping the first region 1000A1 (see FIG. 3), and the second portion of the display panel 100 (see FIG. 3) may be a portion overlapping the third region 1000A3 (see FIG. 3). In this case, the stress on the second conductive layer 505 may be greater than the stress on the first conductive layer 502. According to an embodiment, a thickness TK4 of the second conductive layer 505 may be smaller than a thickness TK3 of the first conductive layer 502. Accordingly, the chances of the second conductive layer 505 having cracks may be reduced.

The second adhesive layer 506 may be disposed under the intermediate base film 504 and may overlap the second conductive layer 505. For example, the second conductive layer 505 may be disposed between the intermediate base film 504 and the second adhesive layer 506.

The cover layer 507 may be disposed under the second adhesive layer 506. The cover layer 507 may be a polyimide film, and the cover layer 507 and the second adhesive layer 506 may be referred to as a second insulating layer or a coverlay. The coverlay is a layer covering or overlapping the second conductive layer 505 and may be a layer serving to protect and insulate the second conductive layer 505.

According to an embodiment, the first conductive layer 502 and the second conductive layer 505 are formed on a side of the base film 501, and thus the coverlay may only be disposed on a side with respect to the base film 501. Accordingly, the thickness TK1 of the digitizer 500 may be reduced compared to the case in which multiple coverlays are provided.

Figure 7:
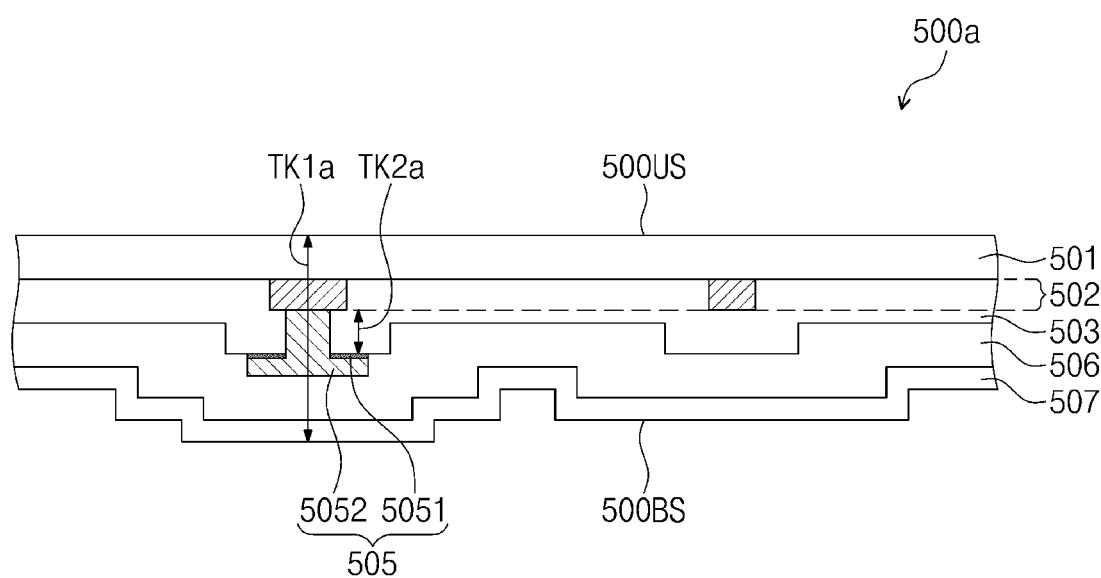
FIG. 7 is a schematic cross-sectional view of a digitizer according to an embodiment.

FIG. 7 is a schematic cross-sectional view of a digitizer according to an embodiment.

Referring to FIG. 7, a digitizer 500a may include a base film 501, a first conductive layer 502, a first adhesive layer 503, a second conductive layer 505, a second adhesive layer 506, and a cover layer 507.

When compared with FIG. 6, the intermediate base film 504 (see FIG. 6) may be omitted from the digitizer 500a. Accordingly, the thickness TK1a of the digitizer 500a may be thinner than the thickness TK1 of the digitizer 500 of FIG. 6. The intermediate base film 504 is omitted, and thus the distance TK2a between the first conductive layer 502 and the second conductive layer 505 of the digitizer 500a may also be smaller than the distance TK2 between the first conductive layer 502 and the second conductive layer 505 of the digitizer 500.

According to an embodiment, when attaching the digitizer 500a to the display panel 100 (see FIG. 4), a surface of the flat base film 501 may be attached. Accordingly, a planarization layer for planarizing the adhesion surface is omitted, and thus a buckling phenomenon caused by the planarization layer may be prevented. The folding performance of the display device 1000 (see FIG. 1A) may be improved due to a decrease in thickness of the digitizer 500a. Both of the first and second conductive layers 502 and 505 may be spaced apart from the display panel 100 (see FIG. 4) with the base film 501 therebetween. Accordingly, a defect which the first conductive layer 502 and the second conductive layer 505 are visible from the outside of the display device 1000 (see FIG. 1A) may be reduced or prevented.

Figure 8:
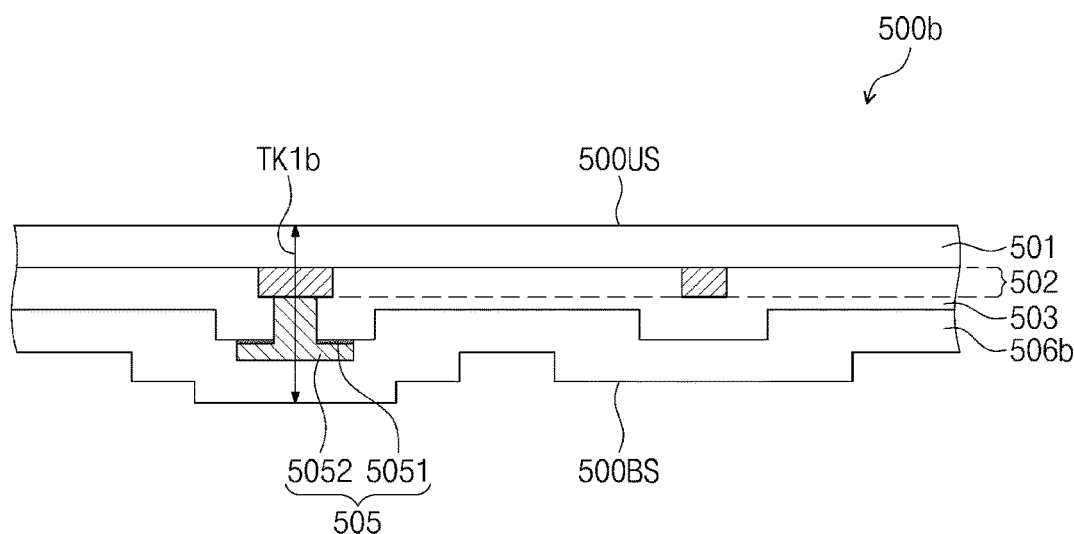
FIG. 8 is a schematic cross-sectional view of a digitizer according to an embodiment.

FIG. 8 is a schematic cross-sectional view of a digitizer according to an embodiment.

Referring to FIG. 8, a digitizer 500b may include a base film 501, a first conductive layer 502, a first adhesive layer 503, a second conductive layer 505, and a second insulating layer 506b.

The first adhesive layer 503 may be a pressure sensitive adhesive film and may be referred to as a first insulating layer. The second insulating layer 506b may include a photosensitive organic material. For example, the second insulating layer 506b may include a photosensitive polyimide.

When compared with FIG. 6, the second insulating layer 506b is formed of a photosensitive polyimide, and thus the temporary bonding and thermal bonding process of the cover layer 507 (see FIG. 6) and the second adhesive layer 506 (see FIG. 6) may be omitted. Accordingly, the manufacturing process may be more simplified. The thickness TK1b of the digitizer 500b may be adjusted by adjusting the thickness of the second insulating layer 506b.

Figure 9:
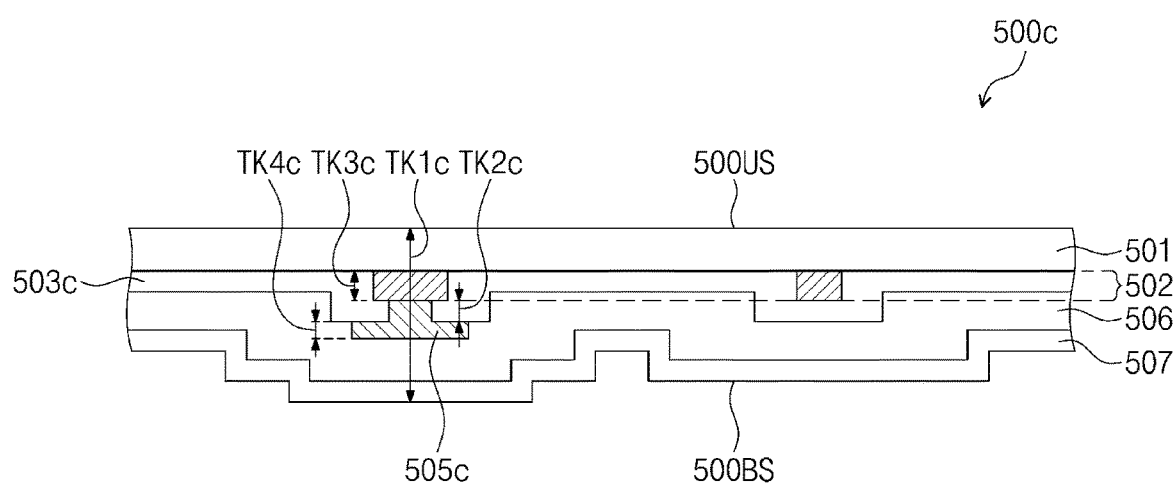
FIG. 9 is a schematic cross-sectional view of a digitizer according to an embodiment.

FIG. 9 is a schematic cross-sectional view of a digitizer according to an embodiment.

Referring to FIG. 9, a digitizer 500c may include a base film 501, a first conductive layer 502, a first insulating layer 503c, a second conductive layer 505c, a second adhesive layer 506, and a cover layer 507. The second adhesive layer 506 and the cover layer 507 may be referred to as an insulating layer or a coverlay.

The first insulating layer 503c may include a photosensitive organic material. For example, the first insulating layer 503c may include a photosensitive polyimide. The thickness of the first insulating layer 503c may be thinner than that of the first insulating layer of FIG. 6, for example, the first adhesive layer 503 and the intermediate base film 504. The distance TK2c between the first conductive layer 502 and the second conductive layer 505c of the digitizer 500c may also be smaller than the distance TK2 between the first conductive layer 502 and the second conductive layers 505 of the digitizer 500 (see FIG. 6). Accordingly, the folding performance of the display device 1000 (see FIG. 1A) may be improved because of a decrease in the thickness TK1c of the digitizer 500c.

The second conductive layer 505c may be disposed under the first insulating layer 503c. The second conductive layer 505c may be formed on the first insulating layer 503c by a sputtering process, but the embodiments are not limited thereto. The thickness TK4c of the second conductive layer 505c may be smaller than the thickness TK3c of the first conductive layer 502.

Figure 10:
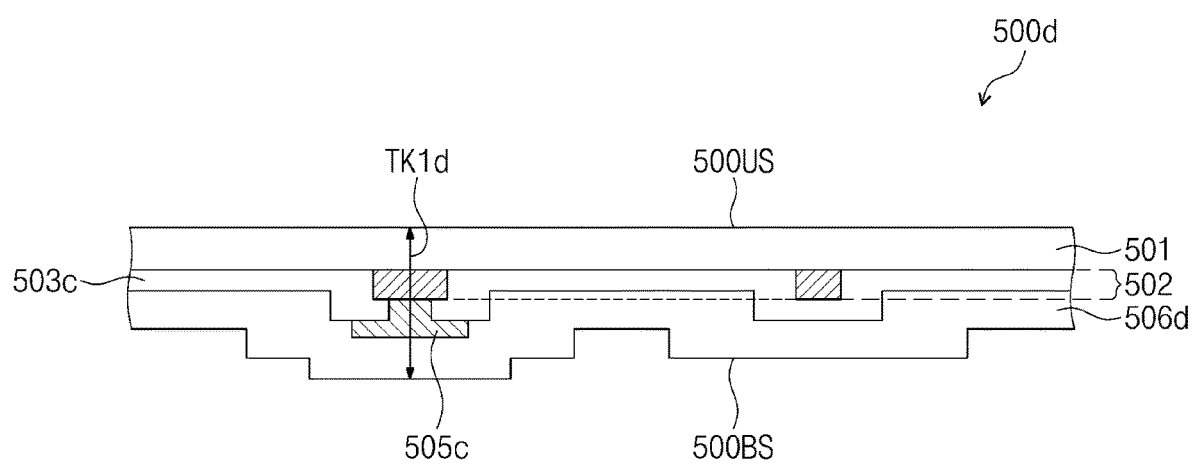
FIG. 10 is a schematic cross-sectional view of a digitizer according to an embodiment.

FIG. 10 is a schematic cross-sectional view of a digitizer according to an embodiment.

Referring to FIG. 10, a digitizer 500d may include a base film 501, a first conductive layer 502, a first insulating layer 503c, a second conductive layer 505c, and a second insulating layer 506d.

The first insulating layer 503c and the second insulating layer 506d may include a photosensitive organic material. For example, each of the first insulating layer 503c and the second insulating layer 506d may include a photosensitive polyimide.

Both the first and second insulating layers 503c and 506d of the digitizer 500d include a photosensitive organic material, and thus the thickness TK1d of the digitizer 500d may be further reduced than those in the above-described embodiments.

FIGS. 11A through 11E are schematic cross-section views illustrating a part of a method for manufacturing a display device according to an embodiment.

Figure 11A:
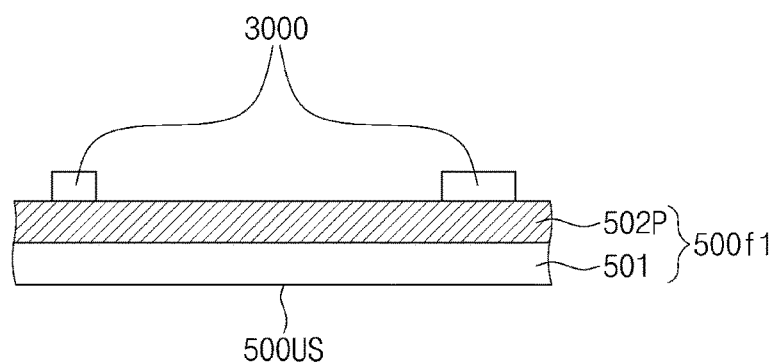
FIG. 11A to 11F are schematic cross-sectional views illustrating a part of a method for manufacturing a display device according to an embodiment.

Referring to FIG. 11A, a first flexible copper clad lamination 500f1 is provided. The first flexible copper clad lamination 500f1 may include a base film 501 and a copper clad layer 502P. A photoresist layer 3000 may be laminated on the copper clad layer 502P. The photoresist layer 3000 may include (or be formed of) a dry film photoresist. For example, a dry film photoresist is laminated on the first flexible copper clad lamination 500f1, and then, when a protective film of the dry film photoresist is peeled off, the photoresist layer 3000 may be laminated on the copper clad layer 502P. Thereafter, the copper clad layer 502P may be patterned by an exposure process and a development process.

Figure 11B:
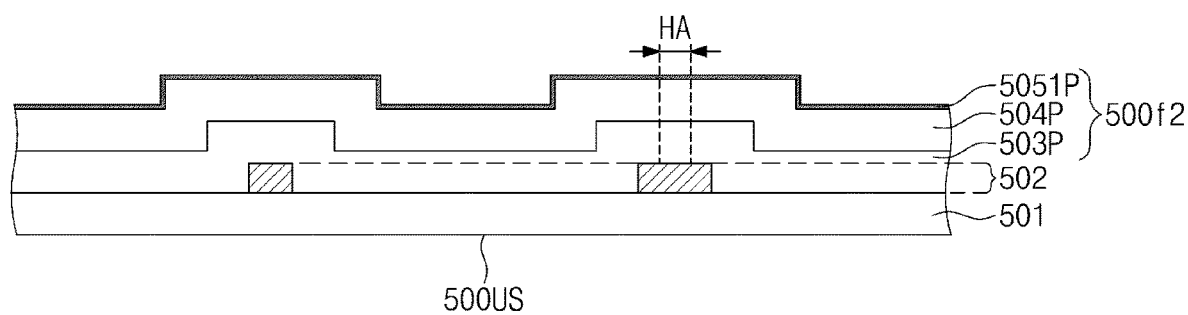

Referring to FIGS. 11A and 11B, the copper clad layer 502P is patterned to form the first conductive layer 502. A second flexible copper clad lamination 500f2 overlaps the first conductive layer 502 and is attached onto the base film 501. The second flexible copper clad lamination 500f2 may include an adhesive layer 503P, an intermediate base film 504P, and a copper clad layer 5051P. When the digitizer 500a shown in FIG. 7 is formed, the second flexible copper clad lamination 500f2 may include only the adhesive layer 503P and the copper clad layer 5051P.

Thereafter, a part of the second flexible copper clad lamination 500f2 overlapping a hole region HA may be removed. For example, the hole region HA may be removed by a process such as laser cutting.

Figure 11C:
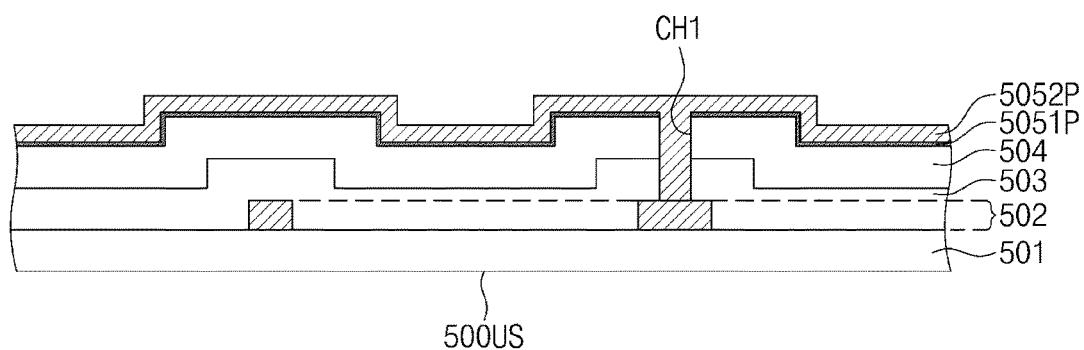

Referring to FIG. 11C, an intermediate conductive layer 5052P is plated on the copper clad layer 5051P. The intermediate conductive layer 5052P may be filled in the opening CH1 penetrating the adhesive layer 503P, the intermediate base film 504P, and the copper clad layer 5051P.

Figure 11D:
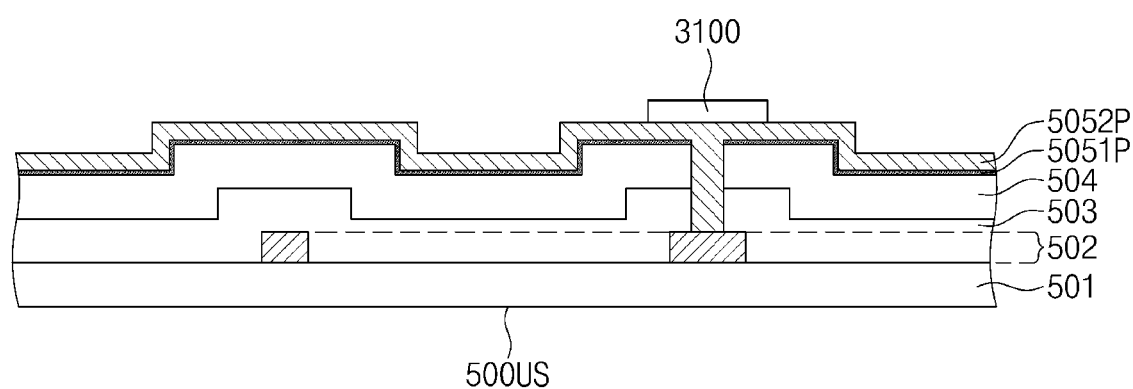

Referring to FIG. 11D, a photoresist layer 3100 may be laminated on the intermediate conductive layer 5052P. The photoresist layer 3100 may be formed by a dry film photoresist. Thereafter, the intermediate conductive layer 5052P and the copper clad layer 5051P may be patterned by an exposure process and a development process.

Figure 11E:
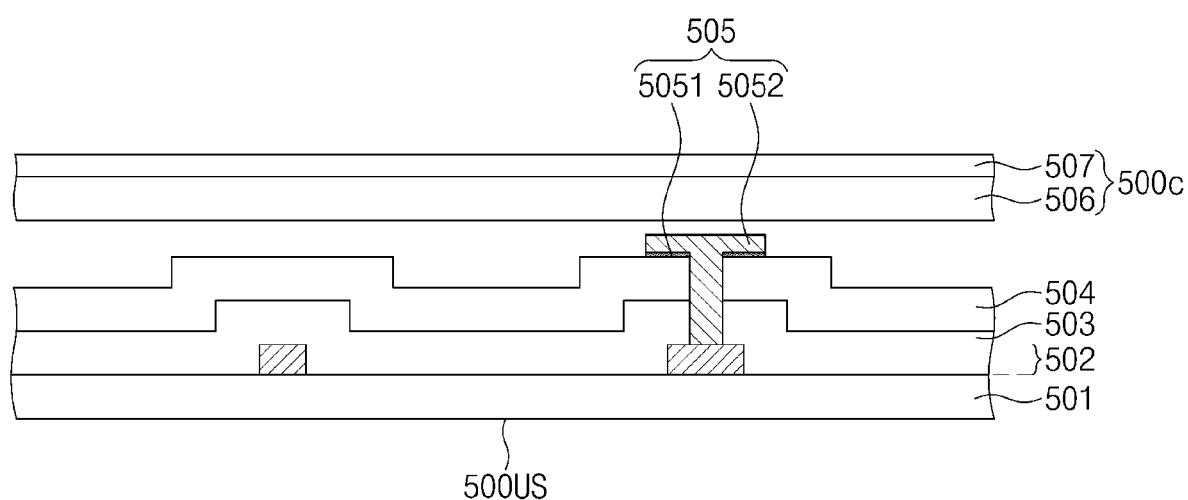

Referring to FIGS. 11D and 11E, the intermediate conductive layer 5052P and the copper clad layer 5051P may be patterned to form a second conductive layer 505. The copper clad layer 5051P may be patterned to form a first sub-conductive layer 5051, and the intermediate conductive layer 5052P may be patterned to form a second sub-conductive layer 5052.

A coverlay 500c1 is disposed on the second conductive layer 505. The coverlay 500c1 may include a second adhesive layer 506 and a cover layer 507. After temporarily attaching the coverlay 500c1 to the second conductive layer 505, the coverlay 500c1 may be press-bonded to the second conductive layer 505 and the intermediate base film 504.

Figure 11F:
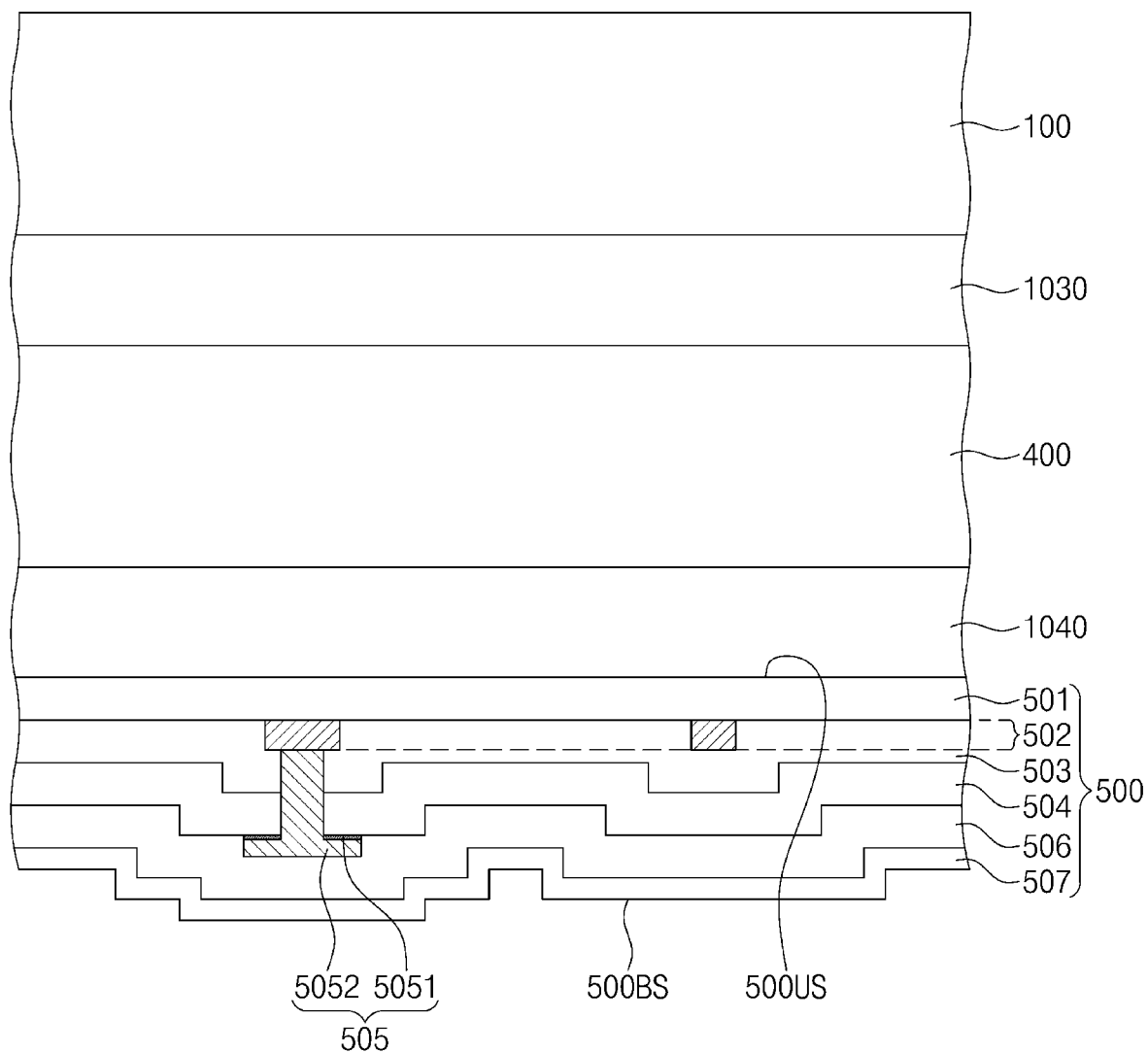

Referring to FIG. 11F, the digitizer 500 is bonded to the display panel 100. For example, the digitizer 500 may be attached to the lower protective film 400 by the fourth adhesive layer 1040.

The upper surface 500US of the digitizer 500 contacting the fourth adhesive layer 1040 may be flat. Accordingly, a process of adding a planarization layer to planarize the digitizer 500 may be omitted. Accordingly, in case that the display device 1000 (see FIG. 1A) is repeatedly folded, a buckling phenomenon caused by the planarization layer may be prevented. Omitting the planarization layer may reduce the thickness of the digitizer 500, and thus the folding performance may be improved, and a reliability issue of the display device 1000 (see FIG. 1A), which may be caused by an increase in the thickness of the digitizer 500, may be reduced.

Both the first conductive layer 502 and the second conductive layer 505 may be disposed under the base film 501. For example, both the first conductive layer 502 and the second conductive layer 505 may be spaced apart from the display panel 100 with the base film 501 therebetween. Accordingly, the first conductive layer 502 and the second conductive layer 505 may be less visible (or may not be visible) from the outside of the display device 1000 (see FIG. 1A).

Figure 12:
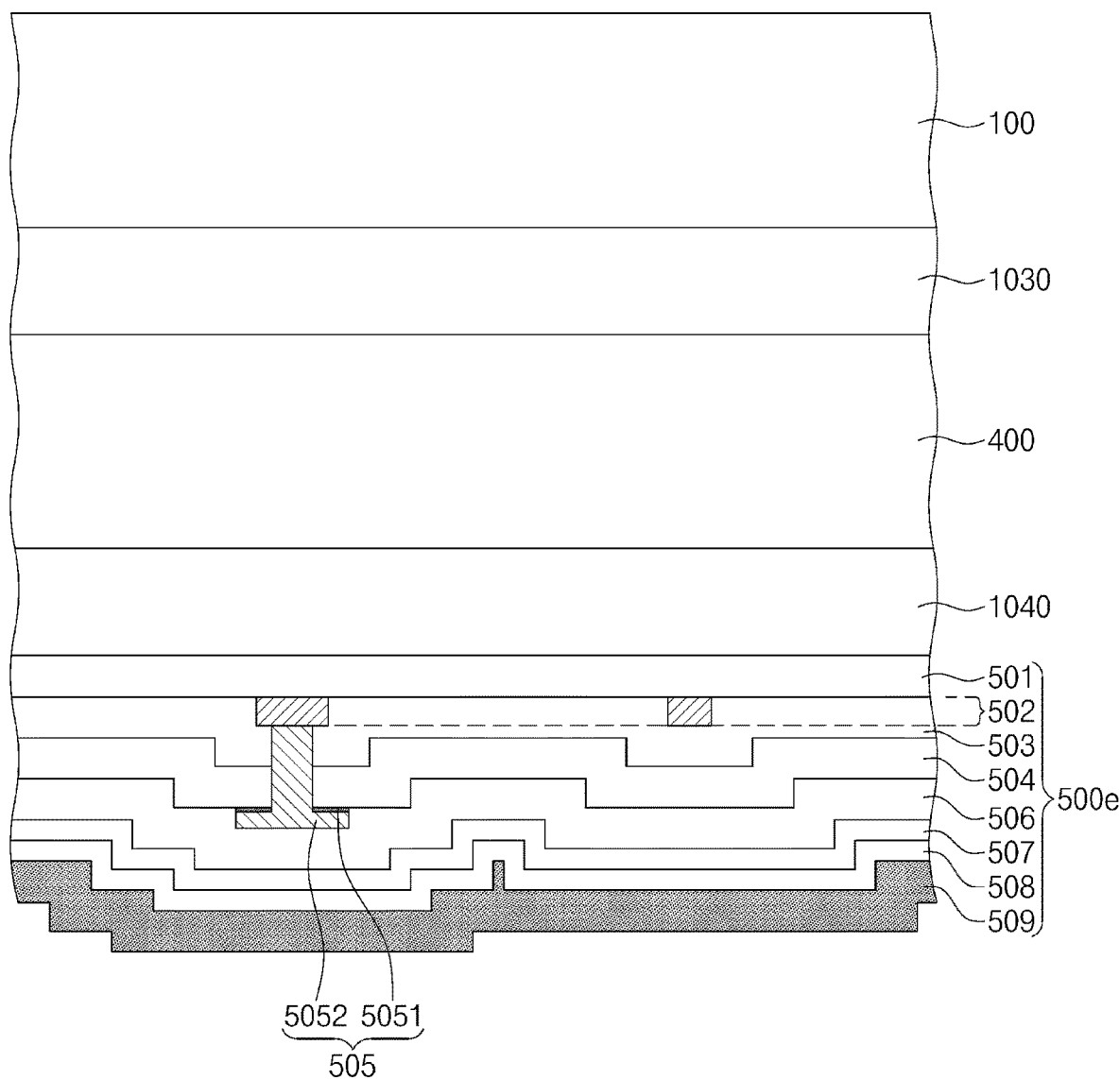
FIG. 12 is a schematic cross-sectional view illustrating a part of the configuration of a display device according to an embodiment.

FIG. 12 is a schematic cross-sectional view illustrating a part of the configuration of a display device according to an embodiment.

Referring to FIG. 12, a digitizer 500e may further include a third adhesive layer 508 and a magnetic shield layer 509. The magnetic shield layer 509 may shield magnetic fields generated from electronic modules included in the display device 1000 (see FIG. 1A). Accordingly, sensing sensitivity of the digitizer 500e may be enhanced.

As described above, a surface of a digitizer, for example, an upper surface of the digitizer is flat, and thus a process for planarizing the digitizer may be omitted. Accordingly, in case that a display device is repeatedly folded, a buckling phenomenon caused by a planarization layer may be prevented. As the planarization layer is omitted, the thickness of the digitizer may be reduced to enhance folding performance, and a reliability issue of the display device, which may be caused by to an increase in the thickness of the digitizer, may be reduced.

All conductive layers of the digitizer may be spaced apart from a display panel with a base film of the digitizer therebetween. Accordingly, the conductive layers may be less visible or may not be visible from the outside of the display device.

Although the inventive concept has been described with reference to embodiments of the disclosure, it will be understood that the disclosure should not be limited to these embodiments but various changes and modifications can be made by those skilled in the art without departing from the spirit and scope of the disclosure.

Accordingly, the claimed invention of the disclosure is not intended to be limited to the contents set forth in the detailed description of the specification but is intended to be defined by the appended claims.

What is claimed is:

1. A display device comprising:
 a window including a glass substrate;
 a display panel disposed under the window;
 a digitizer disposed under the display panel; and
 an adhesive layer disposed between the display panel and the digitize, wherein
 the digitizer comprises:
  a base film disposed under the display panel;
  a first conductive layer disposed under the base film;
  a first insulating layer disposed under the first conductive layer;
  a second conductive layer disposed under the first insulating layer; and
  a second insulating layer disposed under the second conductive layer,
 the window, the display panel, and the digitizer are capable of being folded and unfolded, and
 the base film of the digitizer directly contacts the adhesive layer.

2. The display device of claim 1, wherein a thickness of the first conductive layer is greater than a thickness of the second conductive layer.

3. The display device of claim 1, wherein the second conductive layer comprises:
 a first sub-conductive layer disposed under the first insulating layer, and
 a second sub-conductive layer disposed under the first sub-conductive layer.

4. The display device of claim 3, wherein
 each of the first sub-conductive layer and the first insulating layer comprises an opening, and
 the second sub-conductive layer electrically contacts the first conductive layer through the opening of each of the first sub-conductive layer and the first insulating layer.

5. The display device of claim 3, wherein the first sub-conductive layer directly contacts the first insulating layer.

6. The display device of claim 1, wherein the digitizer further comprises an intermediate base film disposed between the second conductive layer and the first insulating layer.

7. The display device of claim 6, wherein each of the base film and the intermediate base film comprises a polyimide.

8. The display device of claim 1, wherein each of the first insulating layer and the second insulating layer comprises a pressure sensitive adhesive film.

9. The display device of claim 1, wherein
one of the first insulating layer or the second insulating layer comprises a photosensitive polyimide, and
the other of the first insulating layer or the second insulating layer is a pressure sensitive adhesive film.

10. The display device of claim 1, wherein the digitizer further comprises a cover layer disposed under the second insulating layer.

11. The display device of claim 1, wherein a number of layers of the second conductive layer is greater than a number of layers of the first conductive layer.

12. The display device of claim 1, wherein the display panel and the digitizer are in-folded such that a first portion of the display panel and a second portion of the display panel face each other.

13. The display device of claim 1, wherein
the display panel comprises:
a sensor layer sensing an external input from an outside of the display device; and
a display layer disposed under the sensor layer and displaying an image, and
the display layer is disposed between the sensor layer and the digitizer.

14. The display device of claim 1, further comprising a protective film disposed between the display panel and the digitizer, wherein
the display panel is attached to the protective film, and
the base film of the digitizer is attached to the protective film.

15. The display device of claim 1, wherein:
the digitizer comprises an upper surface and a lower surface,
the upper surface of the digitizer faces the display panel,
the lower surface of the digitizer is spaced apart from the display panel,
the upper surface of the digitizer is disposed between the display panel and the lower surface of the digitizer, and
in an unfolded state, the upper surface of the digitizer is flat, and the lower surface of the digitizer is uneven.

16. A display device comprising:
a sensor layer sensing an input from an outside of the display device;
a display layer disposed under the sensor layer and displaying an image towards the sensor layer; and
a digitizer disposed under the display layer and including an upper surface facing the display layer and a lower surface spaced apart from the display layer, wherein
the upper surface of the digitizer is disposed between the display layer and the lower surface of the digitizer,
the upper surface of the digitizer is flat, and
the lower surface of the digitizer is uneven.

17. The display device of claim 16, wherein the digitizer comprises:
a base film disposed under the display layer and adjacent to the upper surface of the digitizer;
a first conductive layer disposed under the base film;
a first insulating layer disposed under the first conductive layer;
a second conductive layer disposed under the first insulating layer; and
a second insulating layer disposed under the second conductive layer,
wherein the sensor layer, the display layer, and the digitizer are capable of being folded and unfolded.

18. The display device of claim 17, wherein the digitizer further comprises an intermediate base film disposed between the second conductive layer and the first insulating layer.

19. The display device of claim 18, wherein
the second conductive layer comprises:
a first sub-conductive layer contacting the intermediate base film; and
a second sub-conductive layer disposed under the first sub-conductive layer,
each of the first sub-conductive layer, the intermediate base film, and the first insulating layer comprises an opening, and
the second sub-conductive layer electrically contacts the first conductive layer through the opening of each of the first sub-conductive layer, the intermediate base film, and the first insulating layer.

20. The display device of claim 18, wherein each of the first insulating layer and the second insulating layer comprises a pressure sensitive adhesive film or a photosensitive polyimide.

* * * * *